United States Patent [19]

Hochstetler

[11] 4,097,981
[45] Jul. 4, 1978

[54] METHOD OF FABRICATING C-CLAMP

[76] Inventor: Samuel A. Hochstetler, P.O. Box 97, Topeka, Ind. 46571

[21] Appl. No.: 788,141

[22] Filed: Apr. 18, 1977

Related U.S. Application Data

[60] Division of Ser. No. 675,978, Apr. 12, 1976, abandoned, which is a continuation of Ser. No. 797,070, May 16, 1977.

[51] Int. Cl.² .......................................... B23P 11/00
[52] U.S. Cl. ................................................ 29/441 R
[58] Field of Search ................. 29/441 R, 437, 442, 29/505, 510, 515, 417, 509, DIG. 47; 269/249, 258; 81/177; 403/274, 165

[56] References Cited

U.S. PATENT DOCUMENTS

| 1,559,866 | 11/1925 | Greathead et al. ............ 269/249 X |
| 1,606,898 | 11/1926 | Robinson ........................ 29/441 UX |
| 1,744,413 | 1/1930 | Peterson et al. ................... 145/65 X |
| 3,626,497 | 12/1971 | Lambert et al. ................. 269/249 X |

*Primary Examiner*—Milton S. Mehr
*Attorney, Agent, or Firm*—Gust, Irish, Jeffers & Rickert

[57] ABSTRACT

The method of fabricating a C-clamp composed of a base section having a first jaw extending from one end thereof and a second jaw extending from the opposite end thereof to define a jaw opening. The free end of the first jaw is provided with a first clamp pad affixed thereto facing the jaw opening. An elongate pressure screw is threadedly mounted in the free end of the second jaw and is movable upon threaded rotation relative the second jaw towards and away from the first clamp pad. A polygonal head member having two parallel sides is formed at one end of the pressure screw. An elongate extruded handle having a channel-shaped cross section slidably receives the head member, the parallel sides of the head member being in sliding surface engagement with the inner walls of the handle member. The handle ends are formed to retain the handle on the head member. A swivel ball is formed at the opposite end of the pressure screw. A second clamp pad formed of an extruded member having an arcuate cross-section dimensionally corresponding to the swivel ball diameter, slidably receives the swivel ball. The sides of the extruder member are pinched on either side of the swivel ball to retain the ball between the pinched area in swiveling relation to the extruded member.

10 Claims, 10 Drawing Figures

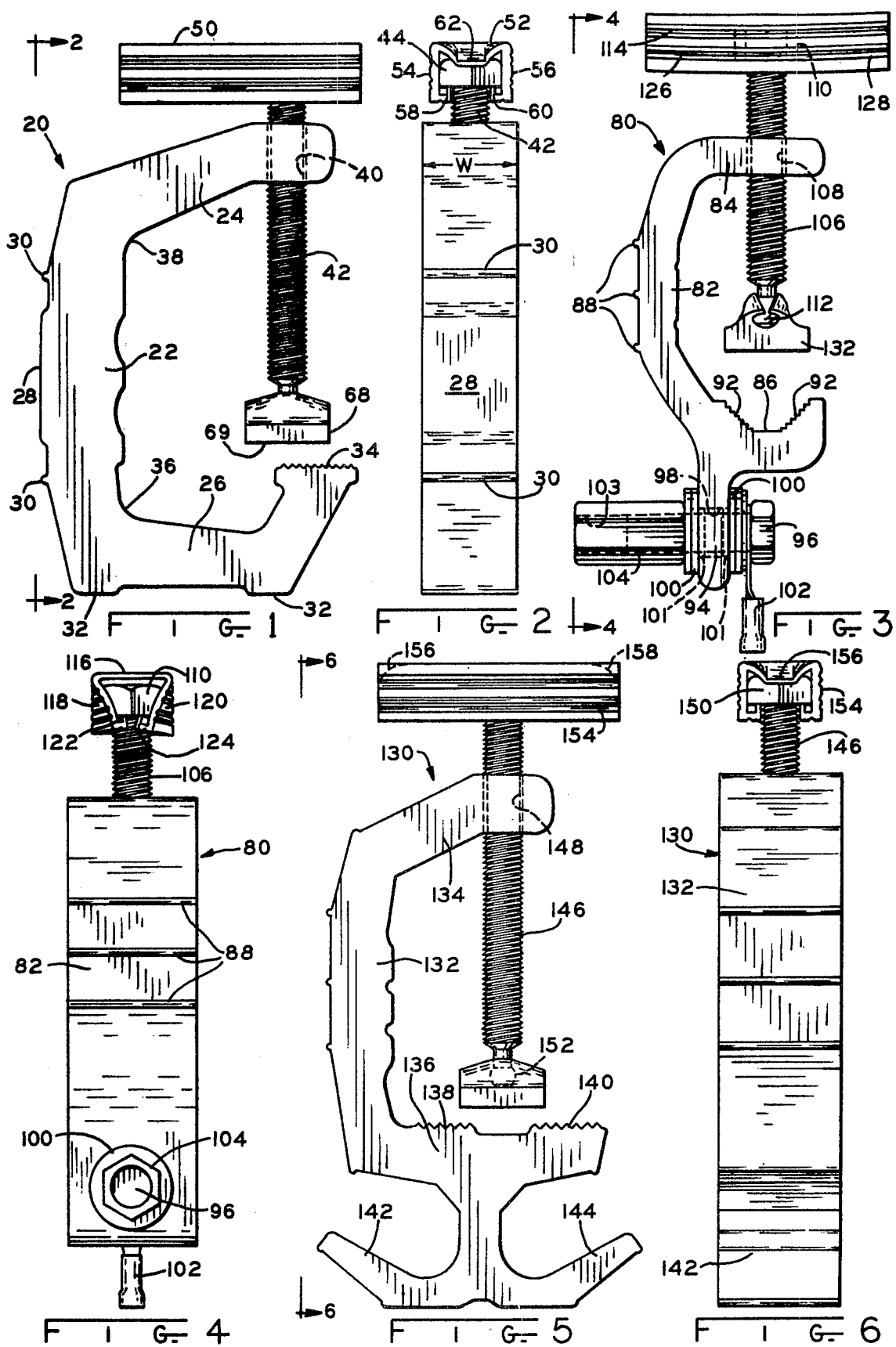

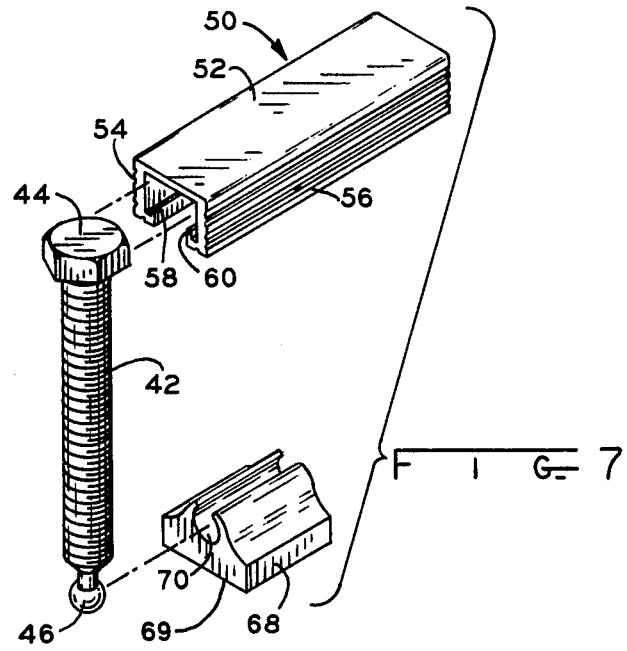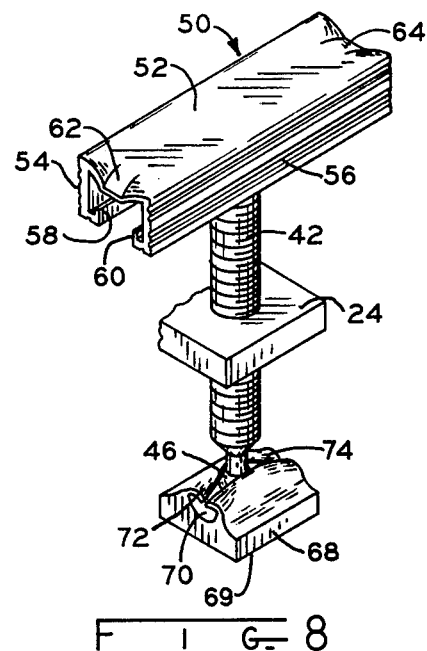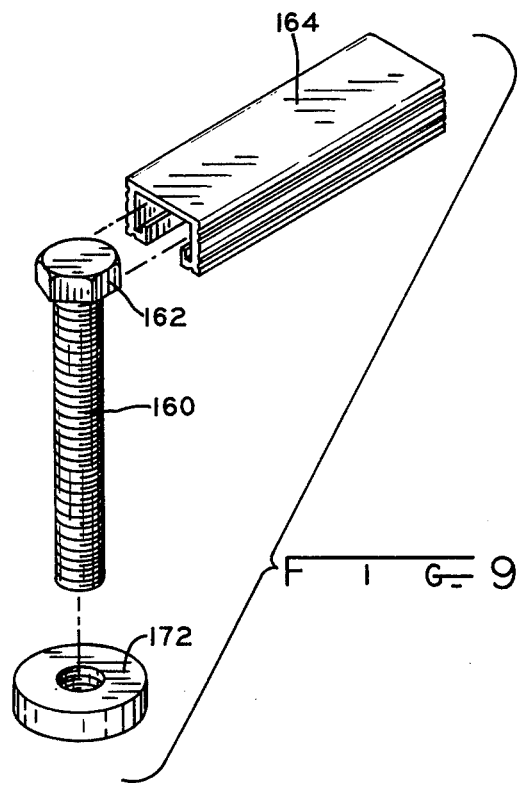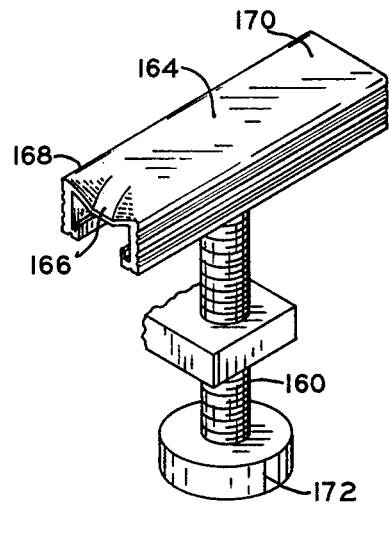

METHOD OF FABRICATING C-CLAMP

This is a divisional of application Ser. No. 675,978, filed Apr. 12, 1976, now abandoned, which is the parent of continuation application Ser. No. 797,070, filed May 16, 1977, entitled "C-CLAMP".

BACKGROUND OF THE INVENTION

1. Field of the Invention

This invention is in the field of C-clamps having spaced jaws defining a jaw opening, one of which threadedly supports a pressure screw for exerting clamping pressure against a clamped member positioned in the jaw opening.

2. Description of the Prior Art

C-clamps are well known as clamping members and generally are formed of forged ferrous materials having opposed spaced jaws, one of which threadably carries a pressure screw. The pressure screw ordinarily has formed at one end thereof a transverse member which may be a cylindrical rod slidable in a transverse cylindrical aperture in the end of the screw. At the opposite end of the screw, a clamping pad is mounted in swivel relationship to a ball joint on the screw end. The screw handle and swivel joint required special machining and consequently were accordingly expensive to manufacture.

SUMMARY OF THE INVENTION

A C-frame cut from a channel shaped extruded aluminum member has a base section supporting at each end thereof first and second jaws to define a jaw opening. The first jaw supports at its free end a first clamp pad, which is serrated to provide a gripping surface. The free end of the second jaw threadedly supports a pressure screw having at one end thereof a conventional hexagonal bolt head and at the other end thereof a swivel ball member. An elongate extruded channel shaped member having parallel inner walls dimensionally corresponding to the spacing between opposite parallel sides of the hexagonal bolt head, and having inwardly formed lips, slidably receives the bolt head, with sliding surface contact being between the parallel head sides and the inner walls of the elongate member. The inwardly formed lips are in sliding engagement with the underside of the bolt head to maintain transverse alignment of the extruded member with the pressure screw. The handle may be pinched at each end for retention on the bolt head or may be crimped at each end to provide retention and permit slidable positioning of the handle on the bolt head to obtain desired leverage and operation in close quarters.

A second extruded aluminum member having an arcuate cross section corresponding to the diameter of the swivel ball, slidably receives the swivel ball. The ends of the second member are pinched inwardly to retain the member in swivel relationship with the ball. The outer surface of the second member forms a second clamping pad in facing relationship with the first clamping pad. Alternatively, the second clamping pad may be a heavy threaded washer threadedly engaged with the end of the clamping screw, making unnecessary the swivel ball. Thus a conventional threaded bolt may be used for the pressure screw further economizing in the clamp construction.

The jaws may form obtuse angles with the base section in order to conserve material, lessen clamp dimension, and provide additional frame strength. A lug may be formed on the outer side of the first jaw to threadedly receive an antenna stud to provide a removable mounting for a vehicle mounted Citizen's Band (CB) antenna. Insulative washers are utilized in the stud mounting to electrically insulate the antenna from the lug. Alternatively, a hook-shaped member may be integrally formed with the outer side of the first jaw to provide a hanging clamp hook. A second hook, formed integrally back-to-back with the first hook, may be formed on the outer side of the first jaw to provide a rope tie-down clamp.

It is therefore an object of this invention to provide a method of fabricating a lightweight, sturdy, C-clamp that provides exceptional economy of manufacture.

Another object of this invention is to provide in the method of the foregoing object, clamp components which may be made from readily available parts and from extruded aluminum sections.

A still further object is to provide in the method of the foregoing objects a clamp which may be economically manufactured for a multitude of purposes.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a side elevational view of a first embodiment of this invention;

FIG. 2 is an end view of the embodiment of FIG. 1;

FIG. 3 is a side elevational view of a second embodiment of this invention;

FIG. 4 is an end view of the embodiment of FIG. 3;

FIG. 5 is a side elevational view of a third embodiment of this invention;

FIG. 6 is an end view of the embodiment in FIG. 5;

FIG. 7 is an exploded, pre-assembled, view in perspective of a pressure screw assembly;

FIG. 8 is an assembled view in perspective of the pressure screw assembly of FIG. 7;

FIG. 9 is an exploded pre-assembled view in perspective of a second embodiment of a pressure screw assembly; and FIG. 10 is a view in perspective of the embodiment of FIG. 9 assembled.

DESCRIPTION OF THE PREFERRED EMBODIMENT

Referring to FIGS. 1 and 2, a first preferred embodiment is shown having a C-frame 20 with a base section 22, upper jaw 24 connected at the upper end thereof and lower jaw 26 connected at the lower end thereof. Frame 20 is cut from an extruded section of 6063 heavy-tempered aluminum having a 75 Barco test for hardness. Frame strength may be controlled by varying the width W of the cut section, the wider cut providing a higher strength frame. The width W of frame 20 is shown in the end view of FIG. 2. Section 22 has a planar surface 28 and parallel ribs 30 which provide a supporting surface for standing frame 20 on base 22. Jaw 26 has pedestals 32 formed on the outer surface thereof to provide spaced supports for standing frame 20 on jaw 26.

Jaws 24 and 26 define a jaw opening therebetween, with jaw 26 having serrated clamp pad 34 affixed to the free end thereof, pad 34 facing the jaw opening. Jaw 26 forms a rounded arc 36 with base 22 which provides added strength and minimizes corner cracking when clamping pressure is applied between jaws 24 and 26. Similarly, jaw 24 forms a rounded arc 38 with base section 22. Further, jaw 24 forms an obtuse angle with base 22 to provide not only added strength but to conserve space while providing a large jaw opening.

Jaw 24 threadedly receives at its free end in threaded bore 40, pressure screw 42 which has hexagonal head 44 formed at the upper end thereof and swivel ball 46 (FIGS. 7 and 8) formed at the lower end thereof. Elongate handle 50 is cut from a channel-shaped extruded aluminum section having base 52 and sidewalls 54 and 56. The inner surfaces of walls 54 and 56 are in close sliding contact with opposite parallel sides of hexagonal head 44. Lips 58 and 60 are formed respectively on walls 54 and 56 and extend inwardly and upwardly against the underside of head 44 in sliding engagement therewith to stabilize handle 50 in a longitudinal direction. After head 44 is inserted in handle 50, each end of base 52 is depressed inwardly to form indentations 62 and 64 to prevent removal of handle 50 from bolt head 44. However, handle 50 may be slid along head 44 to provide increased leverage and also to operate pressure screw 42 in close quarters. Turning of handle 50 will accordingly turn screw 42 causing advancement or retraction relative jaw 24, depending on direction of handle 50 rotation.

An extruded aluminum section 68 (FIGS. 7 and 8) has an arcuate groove 70 with a diameter corresponding to the diameter of ball 46 so that there is a close sliding fit therebetween. Ball 46 is inserted in groove 70 and ends 72 and 74 are pinched to provide a swivel mounting for section 68, the lower surface of which forms a second flat clamp pad 69 facing pad 34. Thus, a swivel pad is provided from an extruded section, adding further to the economy of manufacture of the C-clamp. In the clamp of FIGS. 1 and 2, a portion of the clamping surface of pad 34 extends laterally beyond pad 69 and the free end of jaw 24. Due to this feature of clamp construction, the clamp may be used in a number of applications, such as with truck caps, making unnecessary inserts for providing a clamping grip.

Referring to FIGS. 3 and 4, an embodiment is shown which provides a removable clamp for mounting citizen band (CB), rodtype antennas to vehicle doors and the like. Removing the antenna, guards against theft and with this embodiment, the antenna may be quickly and easily removed and safely stored in the vehicle when the operator leaves the vehicle. In this embodiment, a C-frame 80 has a base section 82, a first jaw 84 extending from one end thereof and a second jaw 86 extending from the other end thereof to define a jaw opening therebetween. Ribs 88 are formed on the outer surface of section 82 to provide a standing support for the clamp on section 82. A pair of serrated surfaces 92 are formed on jaw 86 at approximately a 90° angle to one another and thus will accept in clamped relation a cylindrical member such as a mirror post normally mounted on a vehicle. A lug 94 is formed on and depends from the outer side of jaw 86 to removably receive with clearance antenna stud 96 which is insertable through an opening 98 in lug 94. Stud 96 is inserted through electrical connector 102. Insulative washers 100 on stud 96 are on both sides of lug 94, the washers having annular flanges which fit into opening 98 to provide clearance between stud 96 and opening 98. Nut 104 threadedly secures stud 96 to lug 94. Thus, stud 96 and nut 104 are electrically insulated from clamp 80. A threaded length 103 is provided to threadedly receive an antenna holder, not shown.

Elongate pressure screw 106 is threadedly received in threaded bore 108 of jaw 84. Screw 106 has a hexagonal head 110 at its upper end and a swivel ball 112 at its lower end. An elongate extruded handle 114 having base 116 and walls 118 and 120, receives head 110 in close sliding relation with lips 122 and 124 which are formed inwardly and upwardly from walls 118 and 120, respectively, in sliding relation to the underside of head 110. After handle 114 is centered on head 110, the sidewalls 118 and 120 are pinched towards one another at ends 126 and 128 to hold handle 114 in fixed, centered relation to head 110.

Clamp pad section 132 is constructed in a manner similar to section 68 and assembled to ball 112 in a manner similar to the assembly of section 68 to ball 46, to provide a swivel clamping pad.

Referring to FIGS. 5 and 6, the C-frame 130 has a base section 132 connected at one end to jaw 134 and at the other end to jaw 136 which define a jaw opening therebetween. As in the previous embodiments, frame 130 may be cut from extruded aluminum. Serrated clamping pads 138 and 140 are formed in laterally spaced relation of jaw 136 and face the jaw opening. The spacing between pads 138 and 140 accepts and centers objects with an arcuate or round surface and at the same time provides a planar serrated surface for clamping flat surface objects. Two back-to-back hooks 142 and 144 are integrally formed and depend from the underside of jaw 136. Hooks 142 and 144 provide means for suspending frame 130 and also provide an anchor for a rope tie.

Pressure screw 146 is threadedly received in threaded bore 148 in the end of jaw 134. Screw 146 is similar in construction to screw 42 in the embodiment of FIG. 1 and has hexagonal head 150 at one end thereof and swivel ball 152 at the other end thereof. Handle 154 is similar in construction to handle 50 in the embodiment of FIG. 1 and is assembled to head 150 in a similar manner that handle 50 is assembled to head 44. Thus handle 154 receives head 150 in a close sliding fit and has depressed indentations 156 and 158 at opposite handle ends to prevent removal of handle 154 from head 153. However, handle 154 is slidable between the indentations 156 and 158 to provide additional leverage and pressure screw operation in close quarters.

Referring to FIGS. 9 and 10, a pressure screw construction is shown wherein a standard hex-head bolt 160 may be used. Hexagonal head 162 is received in a close sliding fit in handle 164 which is similar in construction to handle 50. An indentation 166 is placed in end 168 of handle 164 to prevent removal of handle 164 from head 162 in one direction. The opposite end 170 of handle 164 is uncrimped so that the handle may be removed from that direction if desired. It is understood that the handles in any embodiment may be pinched as in FIGS. 4 and 5, or crimped as in FIGS. 1 and 2, depending on the application.

A heavy threaded washer 172 is threadedly received by the end of bolt 160 after which the threads may be deformed by means of a metal punch to prevent removal of washer 172 from screw 160. In this manner a clamping pad is provided which rotates with the screw and is of minimum cost.

In the clamps of this invention, maximum use of extruded aluminum is made. The clamp frames are made from extruded aluminum channels and the strength of the frames may be varied by cutting the frames to appropriate width from the extruded channel. Further, the pressure screw handles are cut from long lengths of extruded aluminum and receive the pressure screw heads in a close sliding fit to again provide a light-in-weight, strong, economical construction. The swivel clamp head is also made from extruded aluminum and has an inner arcuate diameter corresponding to the diameter of the swivel at the end of the screw and is pinched on either side to capture the swivel ball within the arcuate groove. The material used in all of the aforementioned aluminum extrusions preferably is 6063 heavy-tempered aluminum that has a 75 Barco test for hardness.

While the head of the pressure screw shown in hexagonal (polygonal), other head shapes may be used, such as square, having flat sides engageable with the handle sides 54 and 56 to prevent relative rotation; the term "Polygonal" as used in the claims is intended to include such alternative shapes.

While there have been described above the principles of this invention in connection with specific apparatus, it is to be clearly understood that this description is made only by way of example and not as a limitation to the scope of the invention.

I claim:

1. The method of forming a handle comprising the steps of: transversely cutting sections from an extruded metallic channel-shaped member;
   inserting a polygonal bolt head into a section; said bolt head having an interference fit with the sides of said section to prevent relative rotation thereof; and
   forming the section to a smaller cross-sectional size than said head to prevent the withdrawal of the head from the section.

2. The method of claim 1 wherein said last step comprises pinching the sides of the channel-shaped section on either side of the head to retain the section on the head.

3. The method of claim 1 wherein said last step comprises depressing an indentation in said section on both sides of said head.

4. The method of forming a swivel device for a C-clamp comprising the steps of forming a threaded member with a swivel head and neck portion on one end thereof, said neck portion being of smaller dimension transversely of said member than said head,
   forming a metallic body with an open sided groove defined by inturned flanges, said groove and the open side thereof being dimensioned to receive slidably said head and neck portion, respectively, said open side being narrower than said groove,
   inserting said swivel head into said groove with said neck portion being received between said flanges whereby said body is retained against dislodgment from said swivel head longitudinally of said threaded member, and
   deforming portions of said flanges on opposite sides of said swivel head inwardly to a transverse dimension that prevents withdrawal of said head from said groove longitudinally of the latter.

5. The method of claim 4 including the stpe of extruding a length of metal to the cross-sectional shape of said body, and transversely cutting a section off said extruded length to provide said body.

6. The method of claim 5 in which said groove in cross-section is of circular C-shape, said swivel head is spherical and said neck portion is circular, and said deforming step includes depressing said portions of said flanges into said groove to thereby reduce said groove opening on the opposite sides of said head to a size smaller than said neck portion.

7. The method of claim 6 wherein said extrusion has a surface on the side opposite from the groove opening which is essentially flat, said extrusion further being formed of aluminum.

8. The method of fabricating a C-clamp comprising the steps of cutting transverse sections from a first length of extruded metal which is essentially C-shaped in cross-section thereby to provide a plurality of clamping frames, threading a clamping bolt through one end portion of an arm of a frame such that the bolt may be threadedly adjusted across the open side thereof to juxtaposition the bolt end with respect to the other arm of said frame, providing a swivel head on said bolt end defined by an enlarged portion spaced from the body of the bolt by a reduced neck portion, cutting transverse sections from a second length of extruded metal having in cross-section a groove which is essentially C-shaped in cross-section thereby to provide a plurality of clamping pads, assembling a pad onto said swivel head by inserting said head into the groove thereof with the edges of the groove slidably fitting said reduced portion, the spacing between said groove edges being less than the maximum transverse dimension of said swivel head whereby said pad is longitudinally retained on said swivel head, and deforming the C-shaped groove at the opposite ends of said pad to a size smaller than the transverse dimension of said neck portion thereby to retain said pad on said head, the fit between said pad and head providing clearances that permit said pad to swivel on said head.

9. The method of claim 8 in which said groove in cross-section is of circular C-shape, said swivel head is spherical and said neck portion is circular, and said deforming step includes depressing said portions of said flanges into said groove to thereby reduce said groove opening on the opposite sides of said head to a size smaller than said neck portion.

10. The method of claim 1 wherein said section is formed to an orthogonal shape with inturned flanges defining the open side thereof,
    said bolt head having flats on opposite sides thereof which slidably fit between the sides of said section,
    said bolt head having a shoulder on the underneath side thereof and further a thickness as provides a sliding fit between said inturned flanges and the top of said section,
    said inserting step including slidably fitting said bolt head into said channel section from one end thereof.

* * * * *